(12) United States Patent
Yang et al.

(10) Patent No.: US 6,504,709 B2
(45) Date of Patent: Jan. 7, 2003

(54) INPUT DEVICE CAPABLE OF JOINING MODULES

(75) Inventors: Danny Yang, Taipei (TW); Charley Chu, Taipei (TW)

(73) Assignee: Silitek Corporation Corporation, Taipei (TW)

( * ) Notice: Subject to any disclaimer, the term of this patent is extended or adjusted under 35 U.S.C. 154(b) by 103 days.

(21) Appl. No.: 09/732,302

(22) Filed: Dec. 8, 2000

(65) Prior Publication Data

US 2002/0071249 A1 Jun. 13, 2002

(51) Int. Cl.[7] .............................. G06F 1/16; H05K 7/10
(52) U.S. Cl. ........................ 361/686; 361/680; 345/156
(58) Field of Search ................................ 361/680, 686; 710/303, 304; 345/156, 168

(56) References Cited

U.S. PATENT DOCUMENTS

| | | | | |
|---|---|---|---|---|
| 4,823,311 A | * | 4/1989 | Hunter et al. ............... | 364/900 |
| 5,539,616 A | * | 7/1996 | Kikinis ....................... | 361/686 |
| 5,825,617 A | * | 10/1998 | Kochis et al. ............... | 361/686 |
| 6,198,626 B1 | * | 3/2001 | Nakajima et al. ........... | 361/686 |
| 6,231,371 B1 | * | 5/2001 | Helot .......................... | 439/374 |
| 6,297,953 B1 | * | 10/2001 | Helot .......................... | 361/686 |
| 6,353,535 B1 | * | 3/2002 | Yoshida ...................... | 361/686 |

* cited by examiner

*Primary Examiner*—Lynn D. Feild
(74) *Attorney, Agent, or Firm*—Rosenberg, Klein & Lee

(57) ABSTRACT

The present invention proposes an input device capable of joining modules, which device comprises a keyboard and at least an external module. At least an adapting port and a circuit control unit is attached on a keyboard. Each adapting port is connected to the circuit control unit. At least a joining groove is inwardly formed at each outer edge of the housing of the keyboard. Additionally, the outer edge of each module extends to form a joining plate. Through the join of the joining groove and the joining plate, the keyboard and each module can be joined together. Moreover, the output terminal of each module is connected to one adapting port. Thereby, the functionality of the keyboard can be expanded through linkage with different modules and arbitrary replacement of modules.

3 Claims, 5 Drawing Sheets

INPUT DEVICE CAPABLE OF JOINING MODULES

FIELD OF THE INVENTION

The present invention relates to an input device capable of joining modules and, more particularly, to an input device capable of joining a plurality of external modules on a keyboard so as to expand the functionality of the keyboard. The present invention is different from the conventional way of fixedly integrating a plurality of built-in modules in a keyboard, whose extensibility in functionality is thus limited.

BACKGROUND OF THE INVENTION

As shown in FIG. 1, a prior art keyboard comprises a keyboard 11 and a plurality of built-in modules 12 integrally formed and fixed on the keyboard 11. The functions of the built-in modules 12 are added to the keyboard 11 through such a design. However, new modules cannot be added or arbitrarily replaced to expand the functionality of the keyboard through this kind of keyboard design.

SUMMARY OF THE INVENTION

Accordingly, to overcome the above drawbacks of a prior art keyboard, the primary object of the present invention is to inwardly form at least a joining groove at each outer edge of the housing of a keyboard. Additionally, the outer edge of each module extends to form a joining plate. Through the join of the joining groove and the joining plate, the keyboard and each module can be joined together to expand the functionality of the keyboard through linkage with different modules and arbitrary replacement of modules.

To achieve the above object, the present invention provides an input device capable of joining modules, wherein at least an adapting port and a circuit control unit is attached on a keyboard. Each adapting port is connected to the circuit control unit. At least a joining groove is inwardly formed at each outer edge of the housing of the keyboard. Additionally, the outer edge of each module extends to form a joining plate. Through the join of the joining groove and the joining plate, the keyboard and each module can be joined together. Moreover, the output terminal of each module is connected to one adapting port.

The various objects and advantages of the present invention will be more readily understood from the following detailed description when read in conjunction with the appended drawings, in which:

DETAILED DESCRIPTION OF THE PREFERRED EMBODIMENTS

Figure 1:
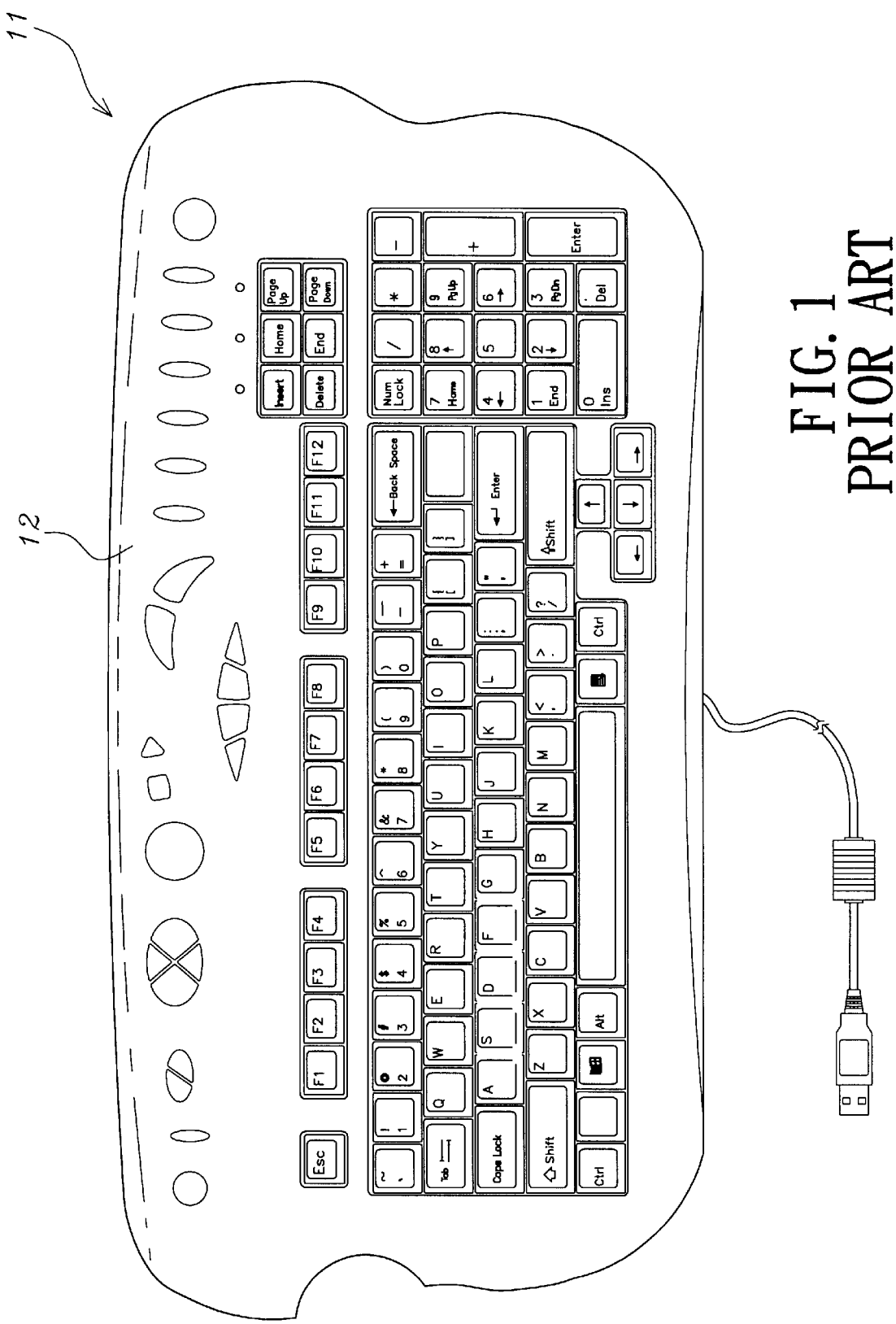
FIG. 1 is a top view of a prior art keyboard.
Figure 2:
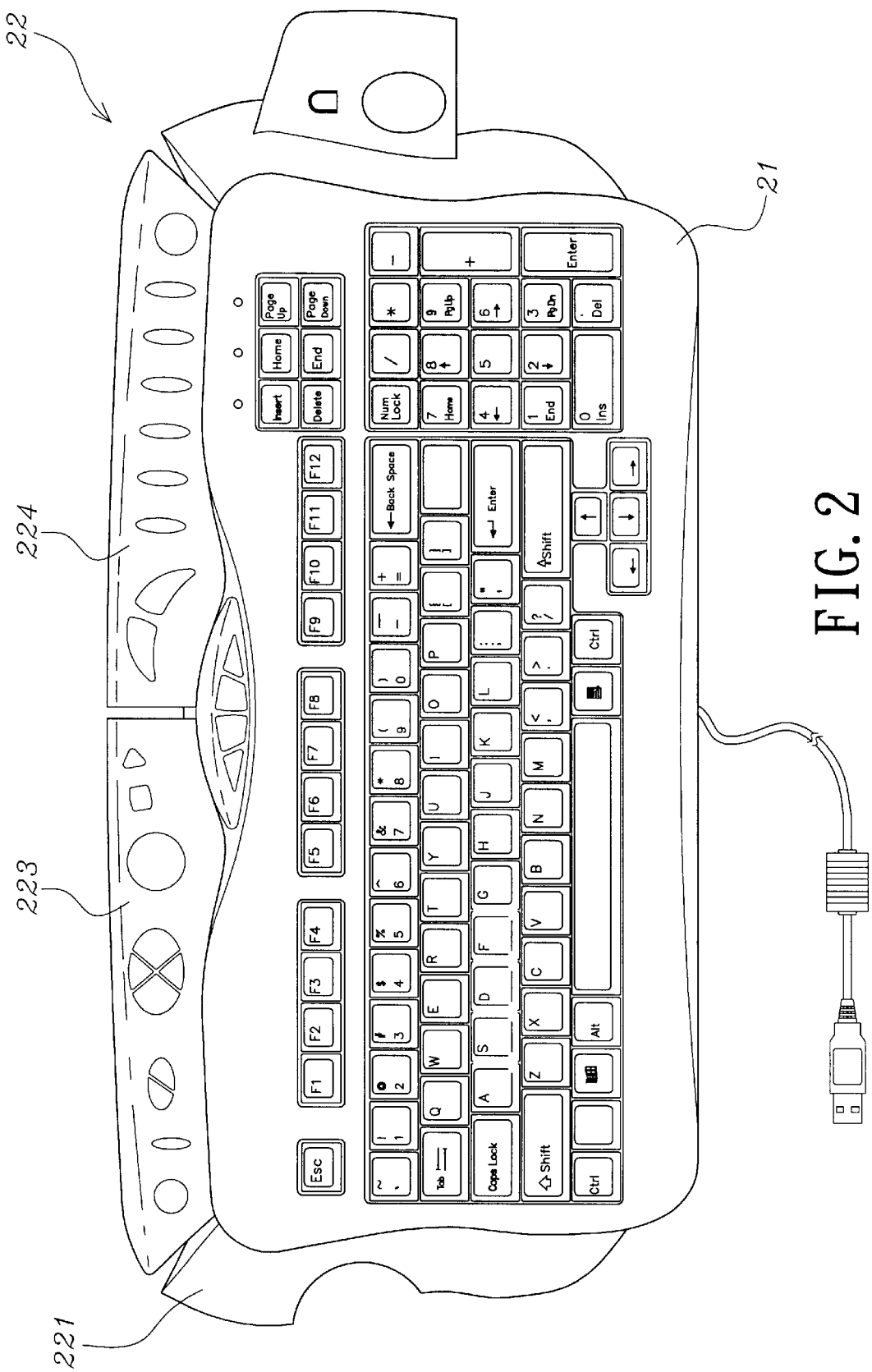
FIG. 2 is a top view of the present invention.
Figure 3:
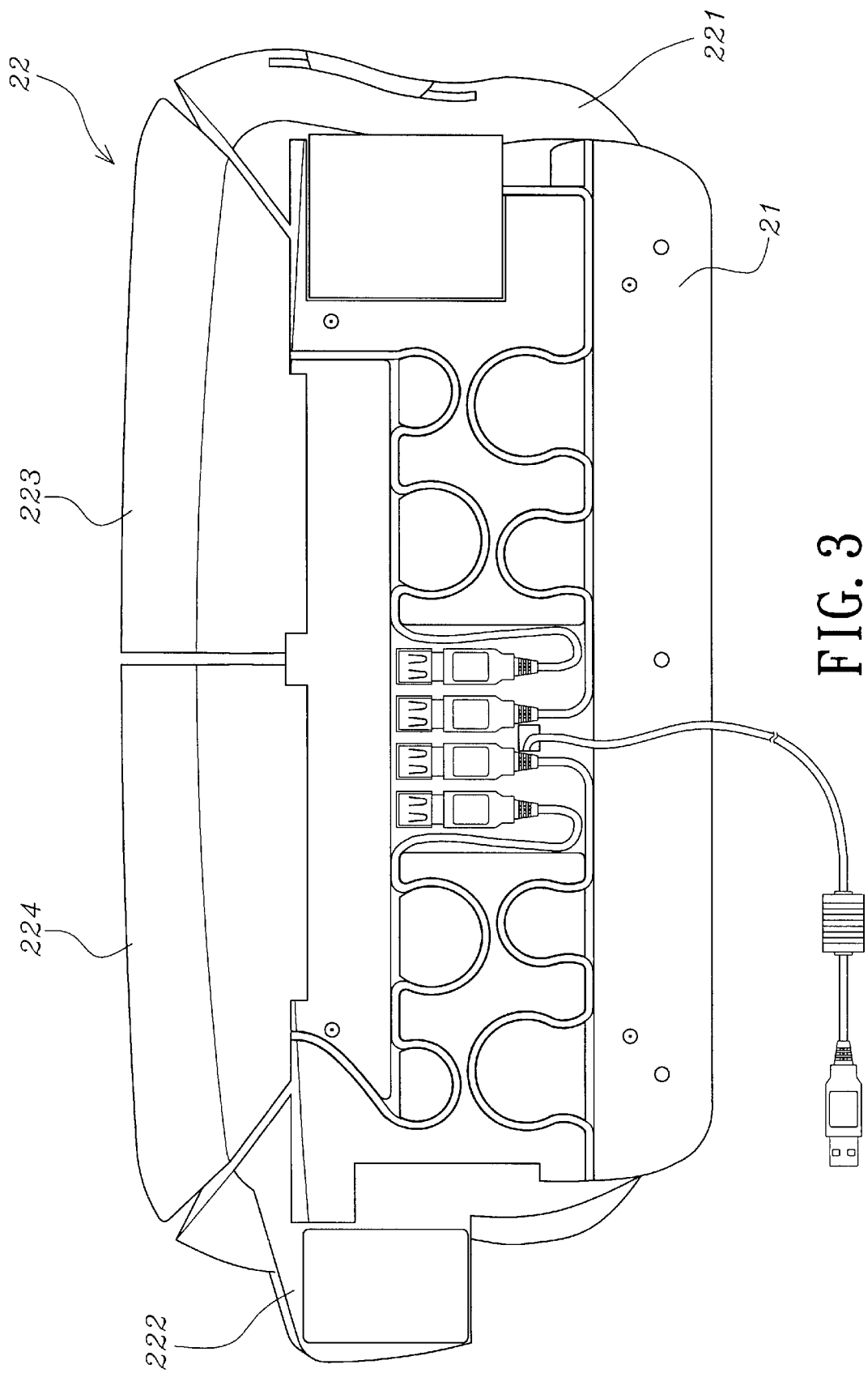
FIG. 3 is a bottom view of the present invention.
Figure 4:
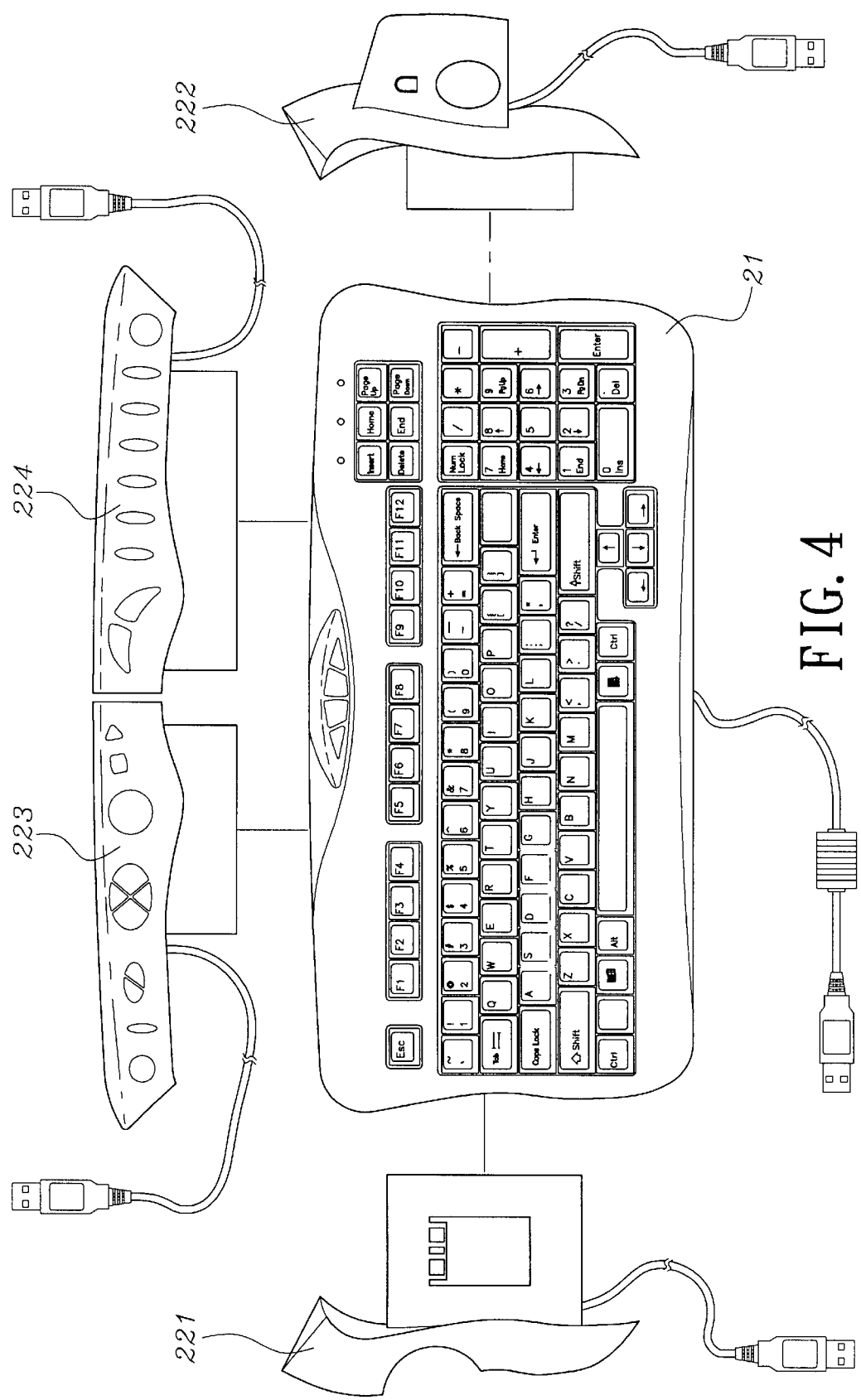
FIG. 4 is an exploded top view of the present invention.

As shown in FIGS. 2 to 4, an input device capable of joining modules according to one embodiment of the present invention comprises a keyboard 21 and four external modules 22, wherein the keyboard 21 is an input unit, and the four external modules 22 are a SmartCard reading module 221, a fingerprint recognition module 222, an audio/video control module 223, and an image-editing module 224, respectively. Through the join of the keyboard 21 and the four external modules 22, new functions can be added to the keyboard 21. Similarly, if new functions are to be added, it is only necessary to replace different modules. Therefore, the expanded module can be a pen-writing input module, a touch control module, a radio-frequency (RF) receiving module of a wireless mouse, and so on. The user can replace the modules himself according to necessity.

Figure 5:
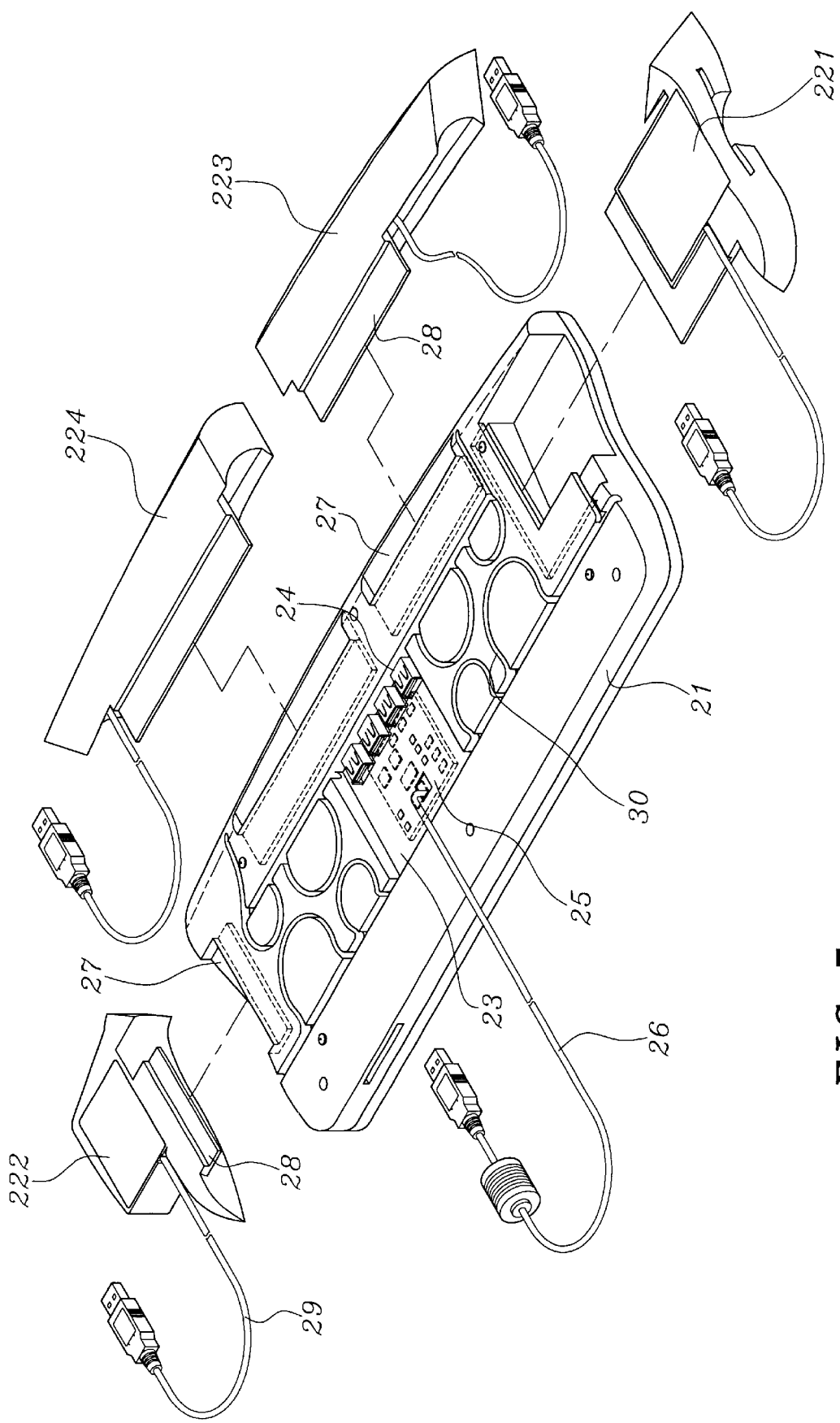
FIG. 5 is an exploded perspective view of the present invention.

As shown in FIG. 5, the bottom of the keyboard 21 comprises a tank 23, four adapting ports 24, a circuit control unit 25, and an electric wire 26. The four adapting ports 24 can be adapting ports of universal serial bus (USB). The four adapting ports 24 are attached in the groove 23, and are connected to the circuit control unit 25 in the groove 23. The circuit control unit 25 is connected to the electric wire 26 so as to be connected to a computer (not shown). Two joining grooves 27 are inwardly formed at the left and right sides of the housing of the keyboard 21, respectively. Two joining grooves 27 are also inwardly formed at the upper edge of the housing of the keyboard 21. The outer edge of each of the four external modules 22 extends to form a joining plate 28. Through the join of the joining grooves 27 and the joining plates 28, the keyboard 21 and the four external modules 22 can be joined together. Additionally, the output terminal of each of the four external modules 22 is connected to a lead 29 to be connected to one of the four adapting ports 24. Linear receiving grooves 30 are formed at the upper and lower sides of the bottom plate of the keyboard 21. The receiving grooves 30 are designed to be a plurality of connected Ω-shaped concave rings. If the lead of the module 22 is too long, the user can accommodate the lead 29 connected to the module 22 in the receiving groove 30 to save space, thereby preventing the disturbance of the lead 29.

To sum up, the input device capable of joining modules of the present invention has the following characteristics.

(1). Through the join of a keyboard and a plurality of modules, new functions can be added to the keyboard. Similarly, it is only necessary to replace different modules in order to add new functions.

(2). A receiving groove is formed on the bottom plate of the keyboard so that the leads connected to the modules can be received therein so as to save space, thereby preventing the disturbance of the leads.

Although the present invention has been described with reference to the preferred embodiments thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

We claim:

1. A peripheral input device for coupling to an external computer, said peripheral input device comprising:

a housing including at least one joining groove inwardly formed on an outer periphery thereof;

at least one peripheral module including a protruding joining plate installed on an outer periphery thereof, said joining plate being removably inserted in said joining groove of said housing, said at least one peripheral module further including a serial communication cable for conveying serial communication signals therethrough;

a control circuit enclosed in said housing for controlling said serial communication signals between the peripheral input device and the external computer, said control circuit electrically coupled to a primary communication cable for conveying said serial communication signals therethrough;

at least one adapting port coupled to said control circuit for conveying said serial communication signals from said at least one peripheral module to said control circuit, said at least one adapting port being electrically coupled to said at least one peripheral module via said serial communication cable of said at least one peripheral module; and a keyboard installed on an upper surface of said housing, said keyboard providing input data to the external computer over said primary communication cable.

2. The peripheral input device for coupling to an external computer as recited in claim 1, wherein said serial communication signals conform to a Universal Serial Bus.

3. The peripheral input device for coupling to an external computer as recited in claim 1, wherein opposing sides of a lower surface of said housing have formed thereon a receiving groove for retaining said serial communication cable of said at least one peripheral module.

* * * * *